(12) United States Patent
Einarsson

(10) Patent No.: US 12,425,539 B2
(45) Date of Patent: *Sep. 23, 2025

(54) CLOSED CAPTIONING MANAGEMENT SYSTEM

(71) Applicant: Adeia Media Holdings LLC, San Jose, CA (US)

(72) Inventor: Torbjorn Einarsson, Stockholm (SE)

(73) Assignee: Adeia Media Holdings LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/218,375

(22) Filed: Jul. 5, 2023

(65) Prior Publication Data

US 2023/0353705 A1 Nov. 2, 2023

Related U.S. Application Data

(63) Continuation of application No. 17/518,866, filed on Nov. 4, 2021, now Pat. No. 11,736,659, which is a
(Continued)

(51) Int. Cl.
*H04B 15/00* (2006.01)
*G10L 21/0232* (2013.01)
(Continued)

(52) U.S. Cl.
CPC ....... *H04N 7/0885* (2013.01); *H04L 65/1089* (2013.01); *H04N 21/41407* (2013.01);
(Continued)

(58) Field of Classification Search
CPC ........... H04N 21/4884; H04N 21/4394; H04N 21/4319; H04N 5/445; H04N 7/0885; H04M 3/5315
(Continued)

(56) References Cited

U.S. PATENT DOCUMENTS 4,897,726 A 1/1990 Morton et al.
7,190,292 B2 * 3/2007 Bizjak .................. H03G 7/002
341/110

(Continued)

OTHER PUBLICATIONS

U.S. Appl. No. 13/454,606, Advisory Action mailed Dec. 14, 2015, 2 pgs.
(Continued)

*Primary Examiner* — George C Monikang
(74) *Attorney, Agent, or Firm* — Haley Guiliano LLP

(57) ABSTRACT

Media content typically includes closed captioning information such as subtitled in domestic and foreign languages. Techniques and mechanisms provide that closed captioning information may be toggled on/off using menu options and preferences as well as automatically managed by intelligently monitoring the environment surrounding a device. Device sensors such as microphones and vibration monitors determine the noise level of an environment as well as the spectral characteristics of the noise to determine whether the noise profile would interfere with the video playback experience. A particular environmental noise profile could automatically trigger the display of closed captioning information or present an easy access, otherwise unavailable toggle to display closed captioning information associated with a video stream.

19 Claims, 4 Drawing Sheets

Related U.S. Application Data continuation of application No. 16/696,740, filed on Nov. 26, 2019, now Pat. No. 11,196,960, which is a continuation of application No. 16/179,131, filed on Nov. 2, 2018, now Pat. No. 10,523,896, which is a continuation of application No. 15/340,925, filed on Nov. 1, 2016, now Pat. No. 10,122,961, which is a continuation of application No. 13/454,606, filed on Apr. 24, 2012, now Pat. No. 9,516,371.

(51) Int. Cl.
   *H04L 65/1089* (2022.01)
   *H04N 7/088* (2006.01)
   *H04N 21/414* (2011.01)
   *H04N 21/422* (2011.01)
   *H04N 21/488* (2011.01)
   *H04N 21/61* (2011.01)

(52) U.S. Cl.
   CPC . *H04N 21/42202* (2013.01); *H04N 21/42203* (2013.01); *H04N 21/4884* (2013.01); *H04N 21/6181* (2013.01)

(58) Field of Classification Search
   USPC ........ 381/58, 71.1–71.4, 94.1–94.3; 348/468
   See application file for complete search history.

(56) References Cited

U.S. PATENT DOCUMENTS

| | | |
|---|---|---|
| 11,736,659 B2 | 8/2023 | Einarsson |
| 2005/0129252 A1 | 6/2005 | Heintzman et al. |
| 2006/0217159 A1 | 9/2006 | Watson |
| 2007/0190982 A1 | 8/2007 | Le |
| 2009/0304191 A1 | 12/2009 | Hoang et al. |
| 2010/0172510 A1* | 7/2010 | Juvonen ............ G10K 11/17873 381/71.1 |
| 2010/0226501 A1 | 9/2010 | Christoph |
| 2010/0266501 A1 | 10/2010 | Meyer et al. |
| 2011/0111805 A1 | 5/2011 | Paquier et al. |
| 2011/0293109 A1 | 12/2011 | Nystroem et al. |
| 2013/0278824 A1 | 10/2013 | Einarsson |
| 2019/0082140 A1 | 3/2019 | Einarsson |
| 2022/0060658 A1 | 2/2022 | Einarsson |

OTHER PUBLICATIONS

U.S. Appl. No. 13/454,606, Non Final Office Action mailed Jun. 4, 2015, 12 pgs.
U.S. Appl. No. 13/454,606, Non Final Office Action mailed Jul. 28, 2014, 9 pgs.
U.S. Appl. No. 13/454,606, Final Office Action mailed Nov. 10, 2014, 11 pgs.
U.S. Appl. No. 13/454,606, Non Final Office Action dated Jun. 4, 2015, 12 pgs.
U.S. Appl. No. 13/454,606, Non Final Office Action mailed Apr. 9, 2014, 9 pgs.
U.S. Appl. No. 13/454,606, Final Office Action mailed Mar. 26, 2016, 11 pgs.
U.S. Appl. No. 13/454,606, Final Office Action mailed Oct. 9, 2015, 11 pgs.
U.S. Appl. No. 13/454,606, Non Final Office Action mailed Apr. 22, 2016, 11 pgs.
U.S. Appl. No. 13/454,606, Notice of Allowance mailed Sep. 29, 2016, 8 pgs.
U.S. Appl. No. 13/454/606, Examiner Interview Summary mailed Aug. 12, 2016, 3 pgs.
U.S. Appl. No. 16/179,131, Notice of Allowance mailed Aug. 28, 2019, 9 pgs.

* cited by examiner

CLOSED CAPTIONING MANAGEMENT SYSTEM

CROSS-REFERENCE TO RELATED APPLICATIONS

This application is a continuation of U.S. patent application Ser. No. 17/518,866, filed Nov. 4, 2021 which is a continuation of U.S. patent application Ser. No. 16/696,740, (now U.S. Pat. No. 11,196,960), filed Nov. 26, 2019, which is a continuation of U.S. patent application Ser. No. 16/179,131, (now U.S. Pat. No. 10,523,896), filed Nov. 2, 2018, which is a continuation of U.S. patent application Ser. No. 15/340,925, (now U.S. Pat. No. 10,122,961), filed Nov. 1, 2016, which is a continuation of U.S. patent application Ser. No. 13/454,606, (now U.S. Pat. No. 9,516,371), filed Apr. 24, 2012. The disclosures of each application are hereby incorporated herein in their entireties.

TECHNICAL FIELD

The present disclosure relates to a closed captioning management system.

DESCRIPTION OF RELATED ART

A variety of conventional mechanisms allow for display of closed captioning and other metadata during playback of video. A viewer can set options and preferences to display closed captioning for a particular movie or program. A variety of menus, touch screen buttons, toggle switches, etc., can be used to show closed captioning or other data such as title and program information. However, mechanisms for managing closed captioning are limited.

Consequently, it is desirable to provide improved techniques and mechanisms for managing closed captioning.

BRIEF DESCRIPTION OF THE DRAWINGS

The disclosure may best be understood by reference to the following description taken in conjunction with the accompanying drawings, which illustrate particular embodiments of the invention.

DESCRIPTION OF EXAMPLE EMBODIMENTS

Figure 1:
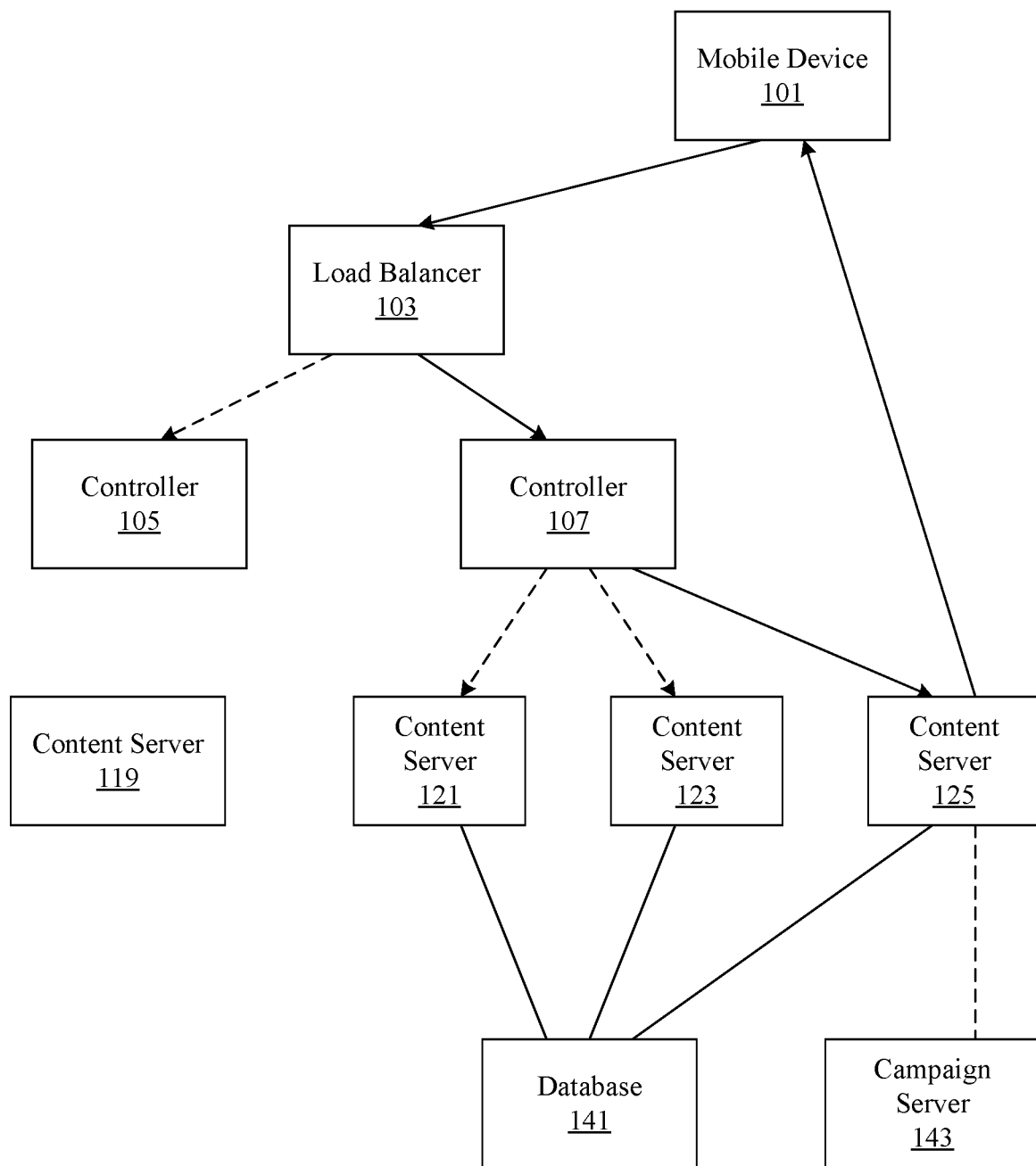
FIG. 1 illustrates one example of a system that can use the techniques and mechanisms of the present invention.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular operations and pipelines. However, it should be noted that the techniques of the present invention apply to a variety of operations and pipelines. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Media content typically includes closed captioning information such as subtitled in domestic and foreign languages. Techniques and mechanisms provide that closed captioning information may be toggled on/off using menu options and preferences as well as automatically managed by intelligently monitoring the environment surrounding a device. Device sensors such as microphones and detectors or monitors determine the noise level of an environment as well as the spectral characteristics of the noise to determine whether the noise profile would interfere with the video playback experience. According to various embodiments, a vibration detector or vibration monitor may be an accelerometer, gyroscope, or other motion detector. A particular environmental noise profile could automatically trigger the display of closed captioning information or present an easy access, otherwise unavailable toggle to display closed captioning information associated with a video stream.

Example Embodiments

Media content such as media streams, media files, clips, etc., that are locally maintained on devices or delivered from content servers to devices typically include at least an audio track, a video track, and a metadata track such as a closed captioning track. For example, the metadata track may display captions, subtitles, and real-time activity relating directly to the content presented in the other tracks. Closed captioning information may include text in one or more languages corresponding to the audio of a particular program One purpose of closed captions for video is to provide access to media for the hearing impaired. Legal requirements increasingly specify that more content and platforms support closed captioning. In many instances, hearing impaired users set device preferences to show captions all of the time. In other instances, foreign language captions may be available to provide accessibility to those unfamiliar with the primary language of the video content.

However, many viewers are unaware of the closed captioning content available with media content. In some instances, viewers may be aware that closed captioning is available but either do not know how to access it or do not bother accessing it. Closed captioning toggles may be buried under layers of menus, hidden in obscure locations, or otherwise difficult to access.

According to various embodiments, the techniques and mechanisms of the present invention recognize that closed captioning content can be automatically provided in particular circumstances. In some examples, closed captioning content is automatically presented when a device is placed in mute mode. In other instances, microphones and sensors can determine environmental noise levels and activate closed captioning when noise levels reach a particular threshold. In still other examples, microphones and sensors can monitor environmental noise levels and spectral components of noise to generate a noise profile to determine when a particular environmental noise profile will interfere with a viewing experience. If a noise profile is determined to interfere with the sound profile of a video program, closed captioning may automatically be turned on. In other examples, if the noise profile is determined to interfere with a sound profile of a program, an easily accessible option to turn on closed captioning can be displayed on a touch screen. An otherwise inaccessible closed captioning toggle option can be made accessible upon determining particular environmental conditions that would interfere with a viewing experience.

In some examples, video advertisements may be replaced with text or image advertisements when a noise profile is determined to be undesirable.

FIG. 1 is a diagrammatic representation illustrating one example of a system that can use the techniques and mechanisms of the present invention. Although a media streaming example is described, it should be noted that closed captioning can automatically be displayed for a variety of different types of content including media streams, media files, clips, etc. According to various embodiments, content servers 119, 121, 123, and 125 are configured to provide media content to a mobile device 101. In some examples, media content may be provided using protocols such as HTTP, RTP, and RTCP. Although a mobile device 101 is shown, it should be recognized that other devices such as set top boxes and computer systems can also be used. In particular examples, the content servers 119, 121, 123, and 125 can themselves establish sessions with mobile devices and stream video and audio content to mobile devices. However, it is recognized that in many instances, a separate controller such as controller 105 or controller 107 can be used to perform session management using a protocol such as RTSP. It is recognized that content servers require the bulk of the processing power and resources used to provide media content to mobile devices. Session management itself may include far fewer transactions. Consequently, a controller can handle a far larger number of mobile devices than a content server can. In some examples, a content server can operate simultaneously with thousands of mobile devices, while a controller that is performing session management can manage millions of mobile devices simultaneously.

By separating outcontent streaming and session management functions, a controller can select a content server geographically close to a mobile device 101. It is also easier to scale, because content servers and controllers can simply be added as needed without disrupting system operation. A load balancer 103 can provide further efficiency during session management by selecting a controller with low latency and high throughput.

According to various embodiments, the content servers 119, 121, 123, and 125 have access to a campaign server 143. The campaign server 143 provides profile information for various mobile devices 101. In some examples, the campaign server 143 is itself a content server or a controller. The campaign server 143 can receive information from external sources about devices such as mobile device 101. The information can be profile information associated with various viewers of the mobile device including interests and background. The campaign server 143 can also monitor the activity of various devices to gather information about the devices. The content servers 119, 121, 123, and 125 can obtain information about the various devices from the campaign server 143. In particular examples, a content server 125 uses the campaign server 143 to determine what type of media clips a viewer on a mobile device 101 would be interested in viewing.

According to various embodiments, the content servers 119, 121, 123, and 125 can also receive media streams from content providers such as satellite providers or cable providers and can send the streams to devices. In particular examples, content servers 119, 121, 123, and 125 access database 141 to obtain desired content that can be used to supplement streams from satellite and cable providers. In one example, a mobile device 101 requests a particular stream. A controller 107 establishes a session with the mobile device 101 and the content server 125 begins streaming the content to the mobile device 101. In particular examples, the content server 125 obtains profile information from campaign server 143.

In some examples, the content server 125 can also obtain profile information from other sources, such as from the mobile device 101 itself. Using the profile information, the content server can select a clip from a database 141 to provide to a viewer. In some instances, the clip is injected into a live stream without affecting mobile device application performance. In other instances, the live stream itself is replaced with another live stream. The content server handles processing to make the transition between streams and clips seamless from the point of view of a mobile device application. In still other examples, advertisements from a database 141 can be intelligently selected from a database 141 using profile information from a campaign server 143 and used to seamlessly replace default advertisements in a live stream. Content servers 119, 121, 123, and 125 have the ability to manipulate packets in order to introduce and/or remove media content, tracks, metadata, etc.

Figure 2:
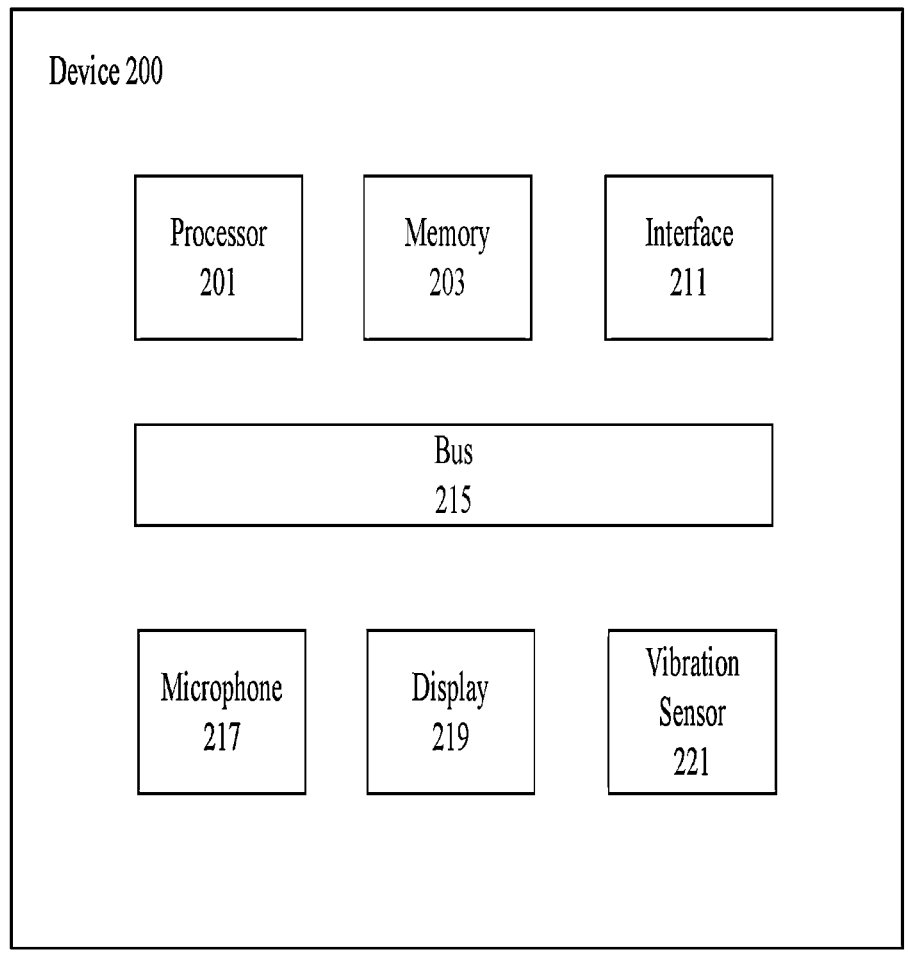
FIG. 2 illustrates one example of a device that can use the techniques and mechanisms of the present invention.

FIG. 2 illustrates one example of a device. According to various embodiments, a device 200 suitable for implementing particular embodiments of the present invention includes a processor 200, a memory 203, an interface 211, a bus 215 (e.g., a PCI bus or other interconnection fabric), a microphone 217, a display 219, a vibration sensor 221, as well as other input and output interfaces. When acting under the control of appropriate software or firmware, the processor 200 is responsible for receiving media streams and processing video, audio, and/or metadata tracks. Various specially configured devices can also be used in place of a processor 200 or in addition to processor 200. The interface 211 is typically configured to send and receive data packets or data segments over a network.

Particular examples of interfaces supported include wireless interfaces, Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to various embodiments, the system 200 is a mobile device that includes a transceiver, streaming buffers, and a program guide database.

Figure 3:
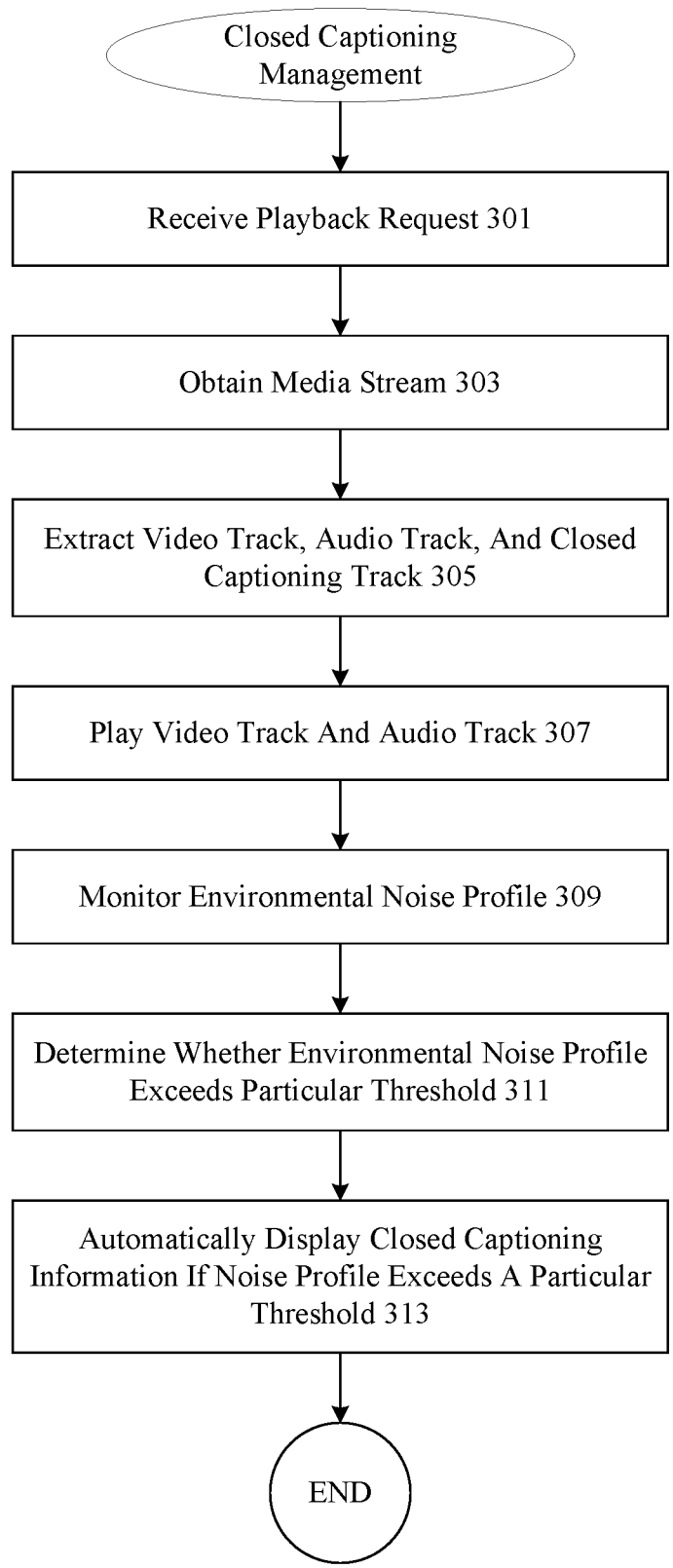
FIG. 3 illustrates one example of closed captioning management.

FIG. 3 illustrates one example of a technique for performing closed captioning management. According to various embodiments, a device receives a playback request from a user of the device at 301. In particular embodiments, the device obtains media content such as a media stream at 303. The media stream may be a live media stream, clip content, a video program, etc. According to various embodiments, the media stream includes a video track, an audio track, and a closed captioning track. In particular embodiments, the device extracts the video track, the audio track, and the closed captioning track at 305. According to various embodiments, the device plays the video track and the audio track at 307. At 309, the device monitors the environmental noise profile using a mechanism such as a microphone. If the noise profile exceeds a particular threshold at 311, closed captioning information is automatically displayed at 313. In some examples, an easily accessible option to display closed captioning content is provided so that menu operations can be bypassed to display closed captioning.

According to various embodiments, the device may simply monitor noise levels in decibels. If the volume of environmental noise exceeds a particular noise level threshold, closed captioning may be automatically displayed or the viewer may be provided with an option to easily display the closed captioning. However, the techniques of the present invention recognize that particular noises or spectral components of noise may be very pronounced without interfering with a viewing experience. In other examples, temporarily loud events may exceed a threshold momentarily, but may not adversely impact a viewing experience. Consequently, the techniques of the present invention provide mechanisms for generating an environmental noise profile that may evaluate spectral components of noise as well as temporal characteristics of noise. In some examples, spectral components of noise and temporal characteristics of noise may be compared to the sound profile of a program to determine whether the noise would interfere with program viewing.

Figure 4:
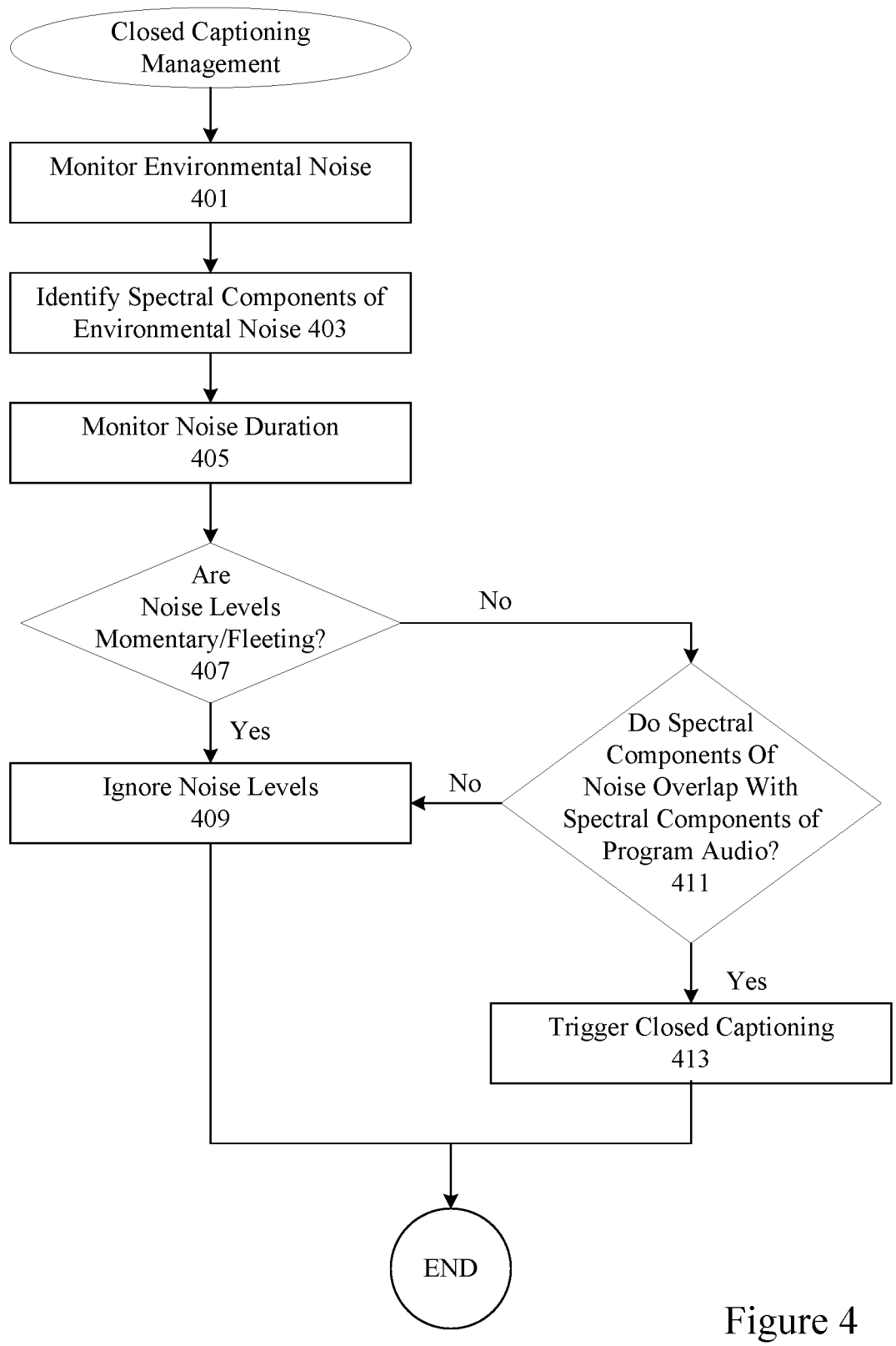
FIG. 4 illustrates another example of closed captioning management.

FIG. 4 illustrates one technique for generating an environmental noise profile. At 401, environmental noise is monitored. At 403, spectral components of environmental noise are identified. Spectral components that may be particularly important are spectral components of noise that overlap with spectral components of program audio. At 405, noise duration is also monitored. According to various embodiments, if significant noise levels are detected but the noise levels are momentary or fleeting at 407, the noise levels are ignored at 409. If the noise levels are persistent at 407, and spectral components of noise overlap with spectral components of program audio at 411, closed captioning may be triggered at 413.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method comprising:
    playing a media content file on a display device, wherein the playing comprises playing of a video track and an audio track relating to the video track, where both the video and audio tracks are associated with the media content file;
    during playback of the media content file, receiving input of noise generated in an area surrounding the display device, wherein the noise is unrelated to the audio track of the media content file being played;
    generating a noise profile for the noise, wherein the noise profile comprises temporal characteristics of the noise;
    determining whether the noise is interfering with the playback of the media content file based on comparing the temporal characteristics of the generated noise profile to a sound profile of the media content file;
    based on determining that the noise is interfering with the playback of the media content file, distinguishing between the noise being momentary and persistent; and
    based on determining that the noise is persistent:
        automatically displaying for selection, an option to display closed captioning relating to the audio track currently being played; and
        displaying the closed captioning corresponding to the audio track being played upon the selection of the displayed option.

2. The method of claim 1, wherein:
    the noise profile further comprises spectral components of the noise; and
    the determining that the noise is interfering with the playback of the media content file is further based on comparing the spectral components of the noise profile to the sound profile of the media content file.

3. The method of claim 1, wherein the option to display closed captioning relating to the audio track is displayed on a touch screen.

4. The method of claim 3, further comprising, bypassing activation of menu options associated with invoking closed captioning when selection of the displayed touch screen option is selected.

5. The method of claim 1, further comprising:
    determining that the media content file is an advertisement; and
    in response to the determination, replacing the advertisement with an image upon determining that the noise is persistent.

6. The method of claim 1, further comprising:
    determining that the display device is placed in a mute mode; and
    in response to the determination, automatically displaying closed captioning relating to the audio track currently being played.

7. The method of claim 1, wherein:
    the noise profile further comprises spectral components of the noise; and
    the determining that the noise is interfering with the playback of the media content file further comprises determining that the noise is interfering with the playback of the media content file if the spectral components of the noise overlap with spectral components of media content file.

8. The method of claim 1, wherein the determining that the noise is interfering with the playback of the media content file further comprises determining if volume of the noise exceeds a predefined noise level threshold.

9. The method of claim 1, further comprising, monitoring using a microphone associated with the display device, the area surrounding the display device on a continuous basis for the noise.

10. A system, comprising:
a processor;
memory storing instructions to execute a method, the method comprising:
    playing a media content file on a display device, wherein the playing comprises playing of a video track and an audio track relating to the video track, where both the video and audio tracks are associated with the media content file;
    during playback of the media content file, receiving input of noise generated in an area surrounding the display device, wherein the noise is unrelated to the audio track of the media content file being played;
    generating a noise profile for the noise, wherein the noise profile comprises temporal characteristics of the noise;
    determining whether the noise is interfering with the playback of the media content file based on comparing the temporal characteristics of the generated noise profile to a sound profile of the media content file;
    based on determining that the noise is interfering with the playback of the media content file, distinguishing between the noise being momentary and persistent; and
    based on determining that the noise is persistent:
        automatically displaying for selection, an option to display closed captioning relating to the audio track currently being played; and
        displaying the closed captioning corresponding to the audio track being played upon the selection of the displayed option.

11. The system of claim 10, wherein:
the noise profile further comprises spectral components of the noise; and
the determining that the noise is interfering with the playback of the media content file is further based on comparing the spectral components of the noise profile to the sound profile of the media content file.

12. The system of claim 10, wherein the option to display closed captioning relating to the audio track is displayed on a touch screen.

13. The system of claim 12, further comprising, the instructions configured are for bypassing activation of menu options associated with invoking closed captioning when selection of the displayed touch screen option is selected.

14. The system of claim 10, further comprising, the instructions configured are for:

determining that the media content file is an advertisement; and
in response to the determination, replacing the advertisement with an image upon determining that the noise is persistent.

15. The system of claim 10, further comprising, the instructions configured are for:
determining that the display device is placed in a mute mode; and
in response to the determination, automatically displaying closed captioning relating to the audio track currently being played.

16. The system of claim 10, wherein:
the noise profile further comprises spectral components of the noise; and
the determining that the noise is interfering with the playback of the media content file further comprises determining that the noise is interfering with the playback of the media content file if the spectral components of the noise overlap with spectral components of media content file.

17. The system of claim 10, further comprising, the instructions configured are for determining that the noise is interfering with the playback of the media content file by determining if volume of the noise exceeds a predefined noise level threshold.

18. The system of claim 10, further comprising, the instructions configured are for monitoring using a microphone associated with the display device, the area surrounding the display device on a continuous basis for the noise.

19. A method comprising:
playing a media content file on a display device, wherein the playing comprises playing of a video track and an audio track relating to the video track, where both the video and audio tracks are associated with the media content file;
during playback of the media content file, receiving input of noise generated in an area surrounding the display device, wherein the noise is unrelated to the audio track of the media content file being played;
generating a noise profile for the noise, wherein the noise profile comprises both spectral components and temporal characteristics of the noise;
determining whether the noise is interfering with the playback of the media content file based on comparing the spectral components and the temporal characteristics of the noise profile to a sound profile of the audio track of the media content file;
based on determining that the noise is interfering with the playback of the media content file, distinguishing between the noise being momentary and persistent; and
in response to determining that the noise is persistent:
    automatically displaying for selection, an option to display closed captioning relating to the audio track currently being played; and
    displaying the closed captioning corresponding to the audio track being played upon the selection of the displayed option.

* * * * *